(12) United States Patent
Jeong et al.

(10) Patent No.: US 12,544,561 B2
(45) Date of Patent: Feb. 10, 2026

(54) MULTIMODAL CRANIAL NERVE STIMULATION TREATMENT SYSTEM AND METHOD FOR PERSONALIZED OPTIMAL REHABILITATION

(71) Applicant: CYBERMEDIC CO., LTD., Gwangju (KR)

(72) Inventors: Ho Choon Jeong, Gunsan-si (KR); Hyun Hee Lee, Jeonju-si (KR); Myung Chun Kim, Iksan-si (KR)

(73) Assignee: CYBERMEDIC CO., LTD., Gwangju (KR)

( * ) Notice: Subject to any disclaimer, the term of this patent is extended or adjusted under 35 U.S.C. 154(b) by 213 days.

(21) Appl. No.: 18/531,735

(22) Filed: Dec. 7, 2023

(65) Prior Publication Data

US 2024/0207603 A1 Jun. 27, 2024

(30) Foreign Application Priority Data

Dec. 23, 2022 (KR) .......... 10-2022-0183614
Oct. 26, 2023 (KR) .......... 10-2023-0145129

(51) Int. Cl.
*A61N 1/04* (2006.01)
*A61N 1/36* (2006.01)

(52) U.S. Cl.
CPC ......... *A61N 1/0456* (2013.01); *A61N 1/0476* (2013.01); *A61N 1/36031* (2017.08)

(58) Field of Classification Search
CPC ... A61N 1/0526; A61N 1/0529; A61N 1/0539
See application file for complete search history.

(56) References Cited

U.S. PATENT DOCUMENTS

2008/0027345 A1\* 1/2008 Kumada ............. A61B 5/291
  600/383
2021/0213285 A1\* 7/2021 Chen ................ A61N 1/36031

FOREIGN PATENT DOCUMENTS

| CN | 114588536 A | 6/2022 |
|---|---|---|
| KR | 10-2004-0031951 A | 4/2004 |
| KR | 10-1874231 B1 | 7/2018 |
| KR | 10-2019-0064205 A | 6/2019 |
| KR | 10-2032620 B1 | 10/2019 |
| KR | 10-2019-0128129 A | 11/2019 |
| KR | 10-2021-0110509 A | 9/2021 |
| KR | 10-2366244 B1 | 2/2022 |
| KR | 10-2023-0089126 A | 6/2023 |

\* cited by examiner

Primary Examiner — Alyssa M Alter
(74) Attorney, Agent, or Firm — Revolution IP, PLLC

(57) ABSTRACT

A multimodal cranial nerve stimulation treatment system for personalized optimal rehabilitation, includes a measurement unit that measures a brain activity signal transmitted from a brain of a subject; an electrical stimulation unit that controls a brain activity of the subject by applying electrical stimulation to the brain of the subject; a haptic stimulation unit that controls the brain activity of the subject by inducing a haptic stimulation motion of the subject based on a content to be provided to the subject from a content providing unit; a detection unit that detects a brain activity region of interest requiring rehabilitation treatment by comparing the brain activity signal measured by the measurement unit with a preset reference brain activity signal; and a control unit that controls at least one of the electrical stimulation unit, the content providing unit, and the haptic stimulation unit.

6 Claims, 12 Drawing Sheets

MULTIMODAL CRANIAL NERVE STIMULATION TREATMENT SYSTEM AND METHOD FOR PERSONALIZED OPTIMAL REHABILITATION

CROSS REFERENCE TO RELATED APPLICATION

The present application claims priority to Korean Patent Application No. 10-2022-0183614, filed Dec. 23, 2022, and Korean Patent Application No. 10-2023-0145129, filed Oct. 26, 2023, the entire contents of which is incorporated herein for all purposes by this reference.

BACKGROUND OF THE INVENTION

Field of the Invention

The disclosure relates to a multimodal cranial nerve stimulation treatment system and method for personalized optimal rehabilitation. Specifically, the disclosure relates to a multimodal cranial nerve stimulation treatment system and method for personalized optimal rehabilitation which can perform precise measurement and monitoring of brain signals, and can perform effective rehabilitation treatment for each subject by inducing various stimuli, such as electrical stimulation and haptic stimulation, to subjects in need of rehabilitation treatment, based on the brain signals measured in real time.

Description of the Related Art

Recently, a method for actively monitoring brain nerve activity brain nerve control are growing very rapidly, and in the future, personalized nerve control technology will be applied not only to the elderly or patients but also to normal people, and the demand is expected to increase further.

Statistical parametric mapping (SPM), which is currently the most widely used brain activity analysis and visualization method, can derive bio-optical, anatomical, and statistically fairly accurate brain activity indices, but its use is complicated. Further, there is a lot of information required, such as various anatomical information and experimental paradigms, making it difficult for non-experts to use it. In addition, experiments performed using the statistical parameter mapping method have the disadvantage of not being able to analyze brain activity in real time because the analysis is performed using data collected after the experiment is completed, so it cannot be used as a brain activity indicator for real-time monitoring.

Meanwhile, functional near infrared spectroscopy (ENIRS) is a method for measuring and monitoring brain activity signals. fNIRS is a method that uses the scattering and absorption characteristics of near-infrared light to non-invasively measure the concentration of oxidized or unoxidized hemoglobin in the cerebral blood flow distributed in the human cerebral cortex. It is currently being used to observe brain cognition and in various brain science and engineering fields. The human head includes the brain, the skull surrounding the brain, and the scalp covering the outer surface of the skull. fNIRS can measure brain activity by irradiating a near-infrared light source to the scalp and receiving the near-infrared rays reflected through the scalp or skull.

Additionally, a method for controlling brain nerves includes a transcranial direct current stimulation (tDCS) method. The tDCS is a method that non-invasively applies fine current stimulation to a person's transcranial region to stimulate the brain and regulate the electrical activity of the brain, enabling control of brain cognitive function. Currently, the tDCS has been reported to be effective in the treatment of many cranial nerve diseases such as depression, epilepsy, dementia, Parkinson's disease, tic disorder, tinnitus, addiction, chronic pain, anxiety disorder, and sleep disorder, as well as rehabilitation treatment of brain diseases such as stroke.

Cranial nerve stimulation treatment using tDCS and ENIRS and measurement of brain activity are performed simultaneously and in real time. Generally, an electrode, which is the output end of tDCS, and a detection end, which is the output end of fNIRS, are mounted on a cap, and the cap is worn on the subject's head. In this condition, the monitoring and stimulation treatment of brain signals by tDCS and fNIRS are performed simultaneously.

However, brain stimulation using tDCS alone has limitations in effective rehabilitation treatment, and rehabilitation treatments such as electrical stimulation and haptic stimulation for paralyzed nerves in the upper extremities also have many limitations.

SUMMARY OF THE INVENTION

The object of the disclosure to solve the above-mentioned problems is to provide a multimodal cranial nerve stimulation treatment system and method for personalized optimal rehabilitation which can precise measurement and monitoring of brain signals, and can perform effective rehabilitation treatment for each subject by inducing various stimuli, such as electrical stimulation and haptic stimulation, to subjects in need of rehabilitation treatment, based on brain signals measured in real time.

The technical objects to be achieved by the disclosure are not limited to the technical objects mentioned above, and other technical objects not mentioned may be clearly understood by those skilled in the art from the following descriptions.

In order to achieve the above object, according to an embodiment of the disclosure, a multimodal cranial nerve stimulation treatment system for personalized optimal rehabilitation, comprises a measurement unit that measures a brain activity signal transmitted from a brain of a subject; an electrical stimulation unit that controls a brain activity of the subject by applying electrical stimulation to the brain of the subject; a haptic stimulation unit that controls the brain activity of the subject by inducing a haptic stimulation motion of the subject based on a content to be provided to the subject from a content providing unit; a detection unit that detects a brain activity region of interest requiring rehabilitation treatment by comparing the brain activity signal measured by the measurement unit with a preset reference brain activity signal; and a control unit that controls at least one of the electrical stimulation unit, the content providing unit, and the haptic stimulation unit, based on the brain activity region of interest detected by the detection unit.

In the multimodal cranial nerve stimulation treatment system for personalized optimal rehabilitation according to an embodiment of the disclosure, the control unit may include at least one of an electrical stimulation setting portion that sets an electrical stimulation condition of the electrical stimulation unit, a content setting portion that sets a difficulty level of the content provided to the subject from the content providing unit, and a haptic stimulation setting portion that set a haptic stimulation condition of the haptic stimulation unit.

In the multimodal cranial nerve stimulation treatment system for personalized optimal rehabilitation according to an embodiment of the disclosure, the electrical stimulation unit may include a plurality of unit stimulation portions, the electrical stimulation setting portion may select a first unit stimulation portion of the plurality of unit stimulation portions disposed at a location corresponding to the brain activity region of interest as an anode, and select at least one second unit stimulation portion present in the brain activity region of interest, among the plurality of unit stimulation portions excluding the first unit stimulation portion, as a cathode.

In the multimodal cranial nerve stimulation treatment system for personalized optimal rehabilitation according to an embodiment of the disclosure, the measurement unit may include a plurality of unit measurement portions, the electrical stimulation unit may include a plurality of unit stimulation portions. The system may further comprise a probe in which the unit measurement portions and the unit stimulation portions are integrated, and a probe assembly that is coupled to a cap worn on a head of the subject and includes a holder to securely support the probe, in order to measure the brain activity signal transmitted from the brain activity region of interest and simultaneously apply the electrical stimulation to the brain activity region of interest.

In the multimodal cranial nerve stimulation treatment system for personalized optimal rehabilitation according to an embodiment of the disclosure, the probe may include a case that includes a head portion and a pipe portion extending from the head portion, a unit measurement portion that is installed inside the pipe portion to measure the brain activity of the subject, and a unit stimulation portion that is installed at a lower portion of the pipe portion to surround the unit measurement portion, and to apply the electrical stimulation to the brain of the subject. In this case, the holder may include a body that is coupled to the mounting hole and fixedly supports an outer circumferential surface of the pipe portion to be inserted, and an electrical resistance reduction portion that includes an electrically conductive solution, is coupled to an open lower space of the body to connect the unit stimulation portion and a scalp of the subject, and includes a through hole formed to allow light transmitted and received from the unit measurement portion to pass through. In this case, the body may include a supplementary solution injection portion that replenishes the electrically conductive solution in the electrical resistance reduction portion.

In the multimodal cranial nerve stimulation treatment system for personalized optimal rehabilitation according to an embodiment of the disclosure, the pipe portion may be provided with a plurality of coupling grooves spaced apart along a height direction on an outer peripheral surface thereof, the body may further include a protrusion coupled to one of the plurality of coupling grooves on an inner peripheral surface thereof.

In the multimodal cranial nerve stimulation treatment system for personalized optimal rehabilitation according to an embodiment of the disclosure, the body may be divided into a lower body disposed on an inside of the cap and an upper body disposed on an outside of the cap, based on a step in close contact with a lower surface of an edge of the mounting hole when the body is coupled to the mounting hole from the inside of the cap. In this case, the holder may further include a lower fixing cap that is inserted from the inside of the cap into an open lower space of the lower body, and an upper fixing cap that is coupled to the outside of the cap to surround the upper body, and is coupled with the lower fixing cap to bring the step into close contact with the lower surface of the edge of the mounting hole.

In the multimodal cranial nerve stimulation treatment system for personalized optimal rehabilitation according to an embodiment of the disclosure, the lower fixing cap may include a lower flange that presses the lower body upward toward the lower surface of the edge of the mounting hole, a sleeve that extends upward from the lower flange and is in close contact with an inner surface of the upper body, and a plurality of locking portions that is formed on an outer surface of the sleeve and penetrates a side opening of the upper body and is coupled to the upper fixing cap.

In the multimodal cranial nerve stimulation treatment system for personalized optimal rehabilitation according to an embodiment of the disclosure, the upper fixing cap may include an upper flange that presses the upper body downward, a plurality of elastic sleeves that extends downward from the upper flange and is spaced apart along a circumferential direction, and a hook that is formed on a lower inner surface of the elastic sleeve and is coupled to the locking portions.

In the multimodal cranial nerve stimulation treatment system for personalized optimal rehabilitation according to an embodiment of the disclosure, the upper fixing cap may include an injection portion cover that is coupled to the lower fixing and cap simultaneously surrounds the supplementary solution injection portion.

In the multimodal cranial nerve stimulation treatment system for personalized optimal rehabilitation according to an embodiment of the disclosure, the unit measurement portion may include a light emitting portion that emits light toward the brain of the subject and a light receiving portion that receives the light reflected from the brain of the subject, wherein one ends of the light emitting portion and light receiving portion are electrically connected to a circuit board disposed on the head portion, and the other ends of the light emitting portion and light receiving portion are disposed through the pipe portion. In this case, the unit stimulation portion may include a cylindrical electrode coupled to a lower portion of the pipe portion to surround lower ends of the light emitting portion and light receiving portion penetrating the pipe portion.

Meanwhile, a multimodal cranial nerve stimulation treatment method for personalized optimal rehabilitation, comprises a measurement step of measuring a brain activity signal transmitted from a brain of a subject using a measurement unit; a stimulation step of applying electrical stimulation to the brain of the subject using an electrical stimulation unit, or controlling a brain activity of the subject by inducing a haptic stimulation motion of the subject based on a content provided to the subject from a content providing unit using a haptic stimulation unit; a detection step of detecting a brain activity region of interest requiring rehabilitation treatment by comparing the measured brain activity signal with a preset reference brain activity signal; and a stimulation control step of controlling at least one of the electrical stimulation unit, the content providing unit, and the haptic stimulation unit to change the brain activity of the subject based on detected brain activity signal information in the brain activity region of interest.

DETAILED DESCRIPTION OF THE INVENTION

Hereinafter, preferred embodiments of the disclosure for solving the foregoing problems will be described with reference to accompanying drawings. In describing the embodiments, like numerals refer to like elements and repetitive descriptions will be avoided as necessary.

Figure 1:
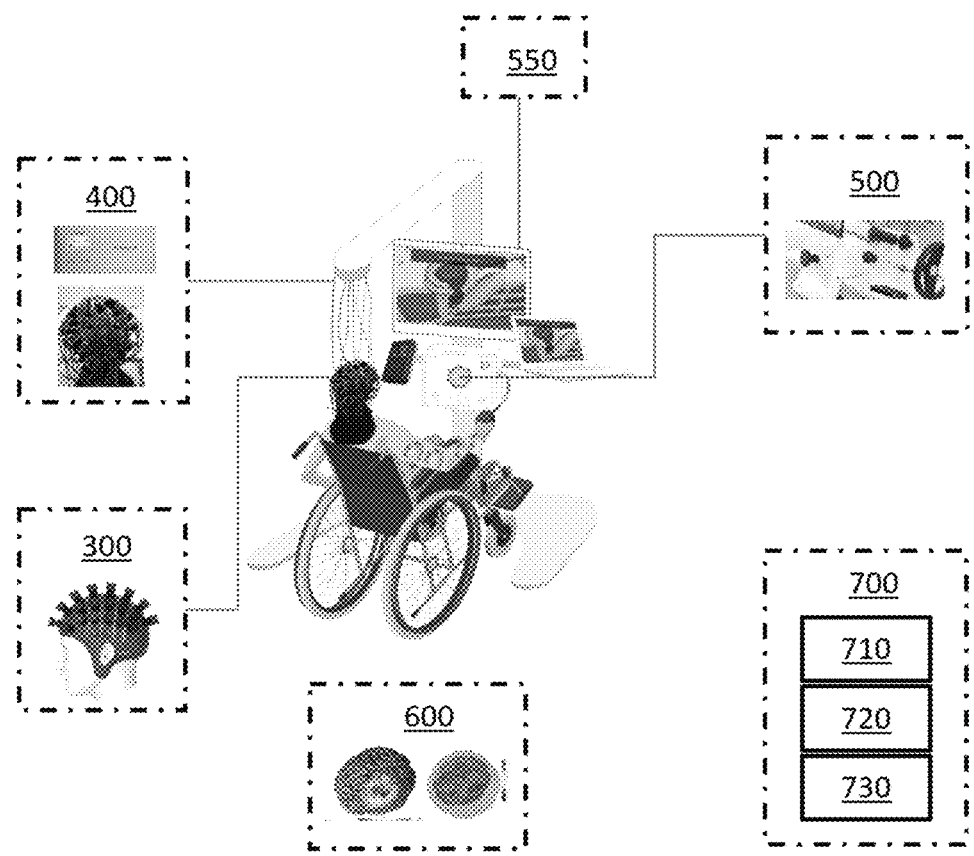
FIG. 1 is an exemplary diagram illustrating an overall configuration of a multimodal cranial nerve stimulation treatment system for personalized optimal rehabilitation according to an embodiment of the disclosure.
Figure 2:
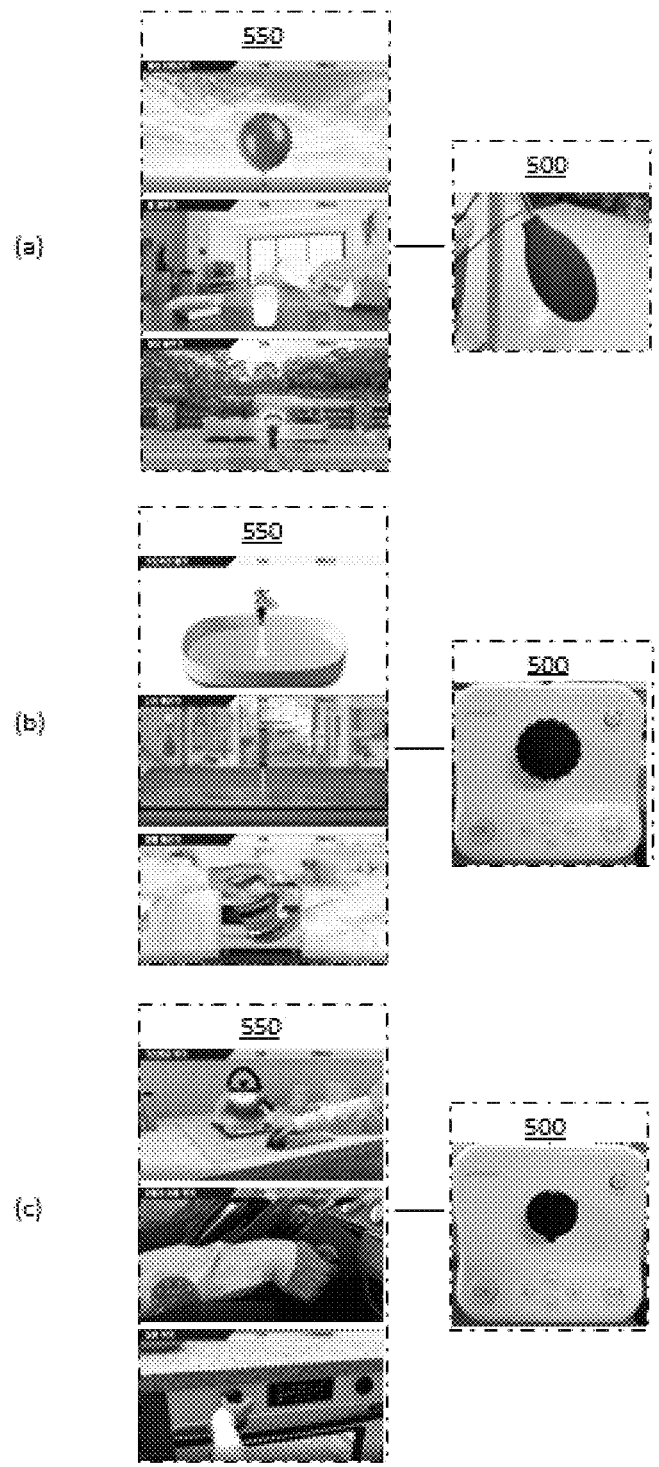
FIG. 2 is an exemplary diagram illustrating various haptic stimulation units corresponding to contents provided to a subject from a content providing unit according to the present embodiment.
Figure 3:
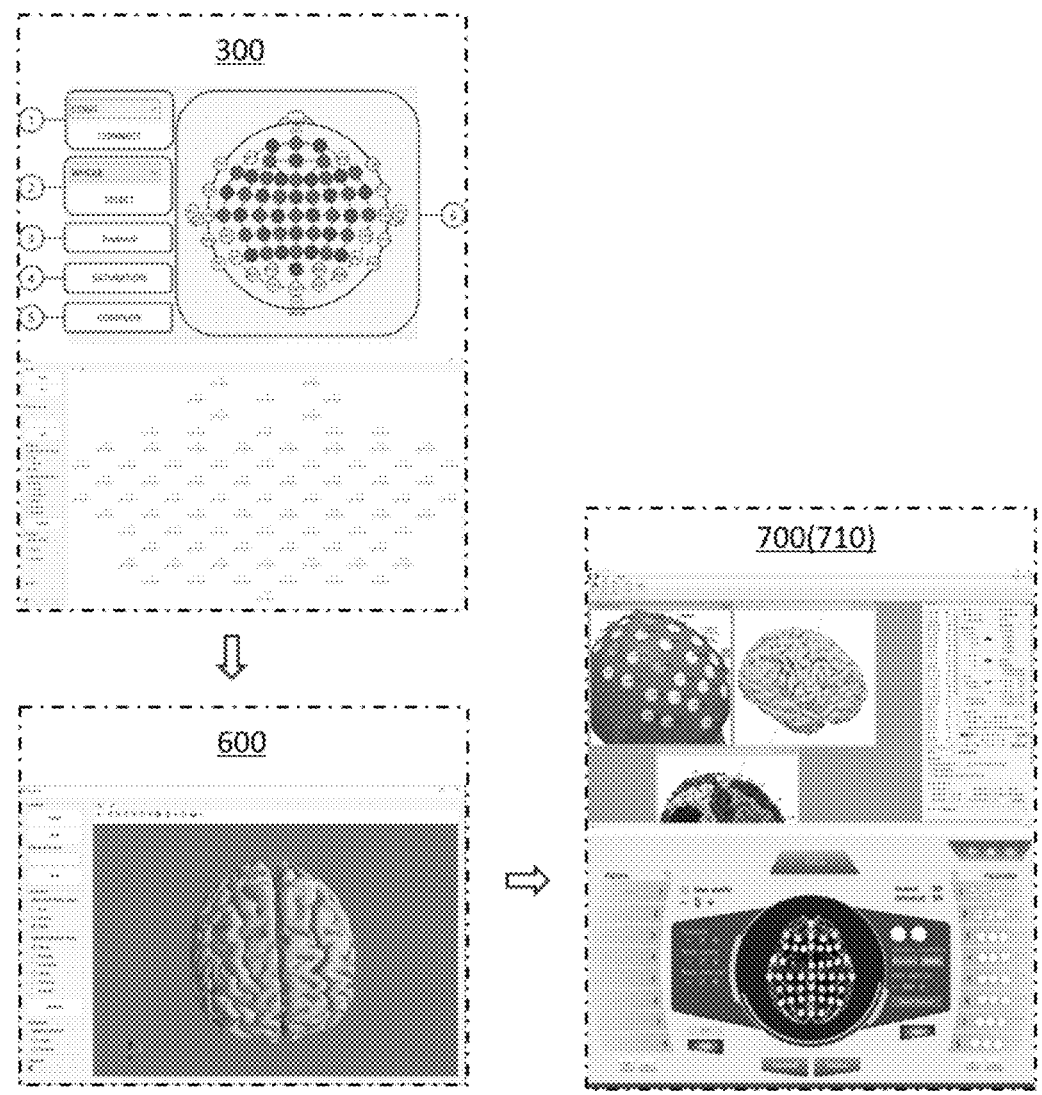
FIG. 3 is an exemplary diagram illustrating an operation flow of a measurement unit, detection unit, and control unit according to the present embodiment.

FIG. 1 is an exemplary diagram illustrating an overall configuration of a multimodal cranial nerve stimulation treatment system for personalized optimal rehabilitation according to an embodiment of the disclosure. FIG. 2 is an exemplary diagram illustrating various haptic stimulation units corresponding to contents provided to a subject from a content providing unit according to the present embodiment. FIG. 3 is an exemplary diagram illustrating an operation flow of a measurement unit, detection unit, and control unit according to the present embodiment.

Figure 4:
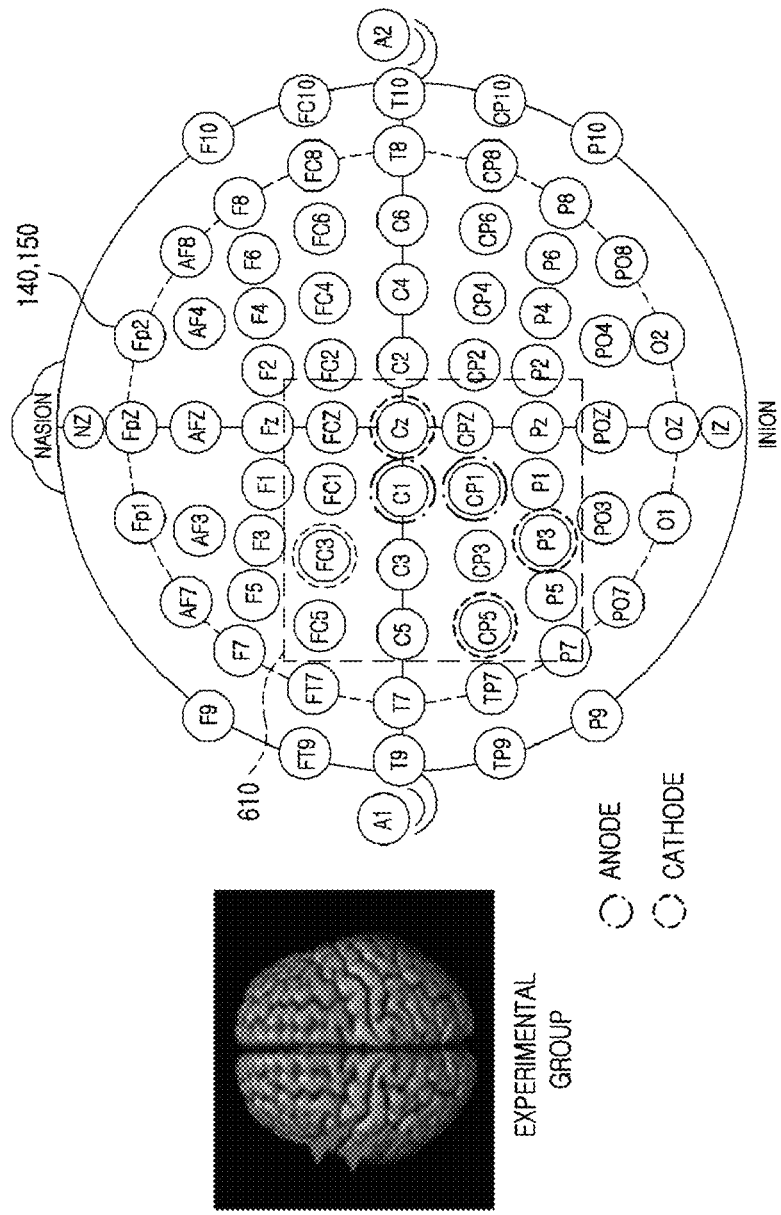
FIG. 4 is an exemplary diagram for explaining a process of setting an electrical stimulation condition in an electrical stimulation setting portion of a control unit according to an embodiment of the disclosure.
Figure 5:
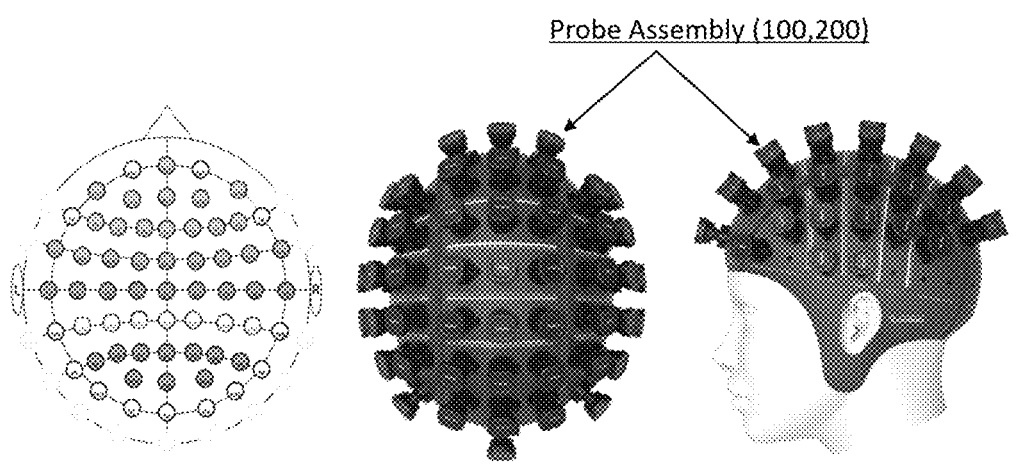
FIG. 5 is an exemplary diagram illustrating a probe assembly integrating a measurement unit and an electrical stimulation unit according to an embodiment of the disclosure.

Further, FIG. 4 is an exemplary diagram for explaining a process of setting an electrical stimulation condition in an electrical stimulation setting portion of a control unit according to an embodiment of the disclosure. FIG. 5 is an exemplary diagram illustrating a probe assembly integrating a measurement unit and an electrical stimulation unit according to an embodiment of the disclosure.

A multimodal cranial nerve stimulation treatment system for personalized optimal rehabilitation according to an embodiment of the disclosure may include a measurement unit 300, an electrical stimulation unit 400, a haptic stimulation unit 500, a detection unit 600, and a control unit 700.

The measurement unit 300 may measure brain activity signals transmitted from the subject's brain.

The measuring unit 300 may be a multi-channel system having a plurality of unit measurement portions 140. This measurement unit 300 may use functional near-infrared spectroscopy (fNIRS). The fNIRS is one of the optical brain monitoring technologies that uses near-infrared spectroscopy for functional neuroimaging purposes, and can use near-infrared light to estimate the dynamic activity of cerebral blood flow that occurs in response to neural activity. In addition, the fNIRS is relatively inexpensive and small in size compared to positron emission tomography (PET) and functional magnetic resonance imaging (fMRI), making it highly portable, and the fNIRS is non-invasive, allowing to simply and quickly acquire neuroimages based on brain activity by simply putting a cap equipped with a measurement unit on a subject's head. In addition, the fNIRS may effectively measure changes in hemoglobin concentration in a region (750 to 850 nm) near the cerebral cortex, and may measure not only a degree of oxygenation in the blood but also a degree of intracellular oxygenation by observing changes in hemoglobin concentration, and calculate cerebral blood flow, cerebral blood volume, etc.

The subject's brain activity signal may be measured in real time through the measurement unit 300, and the brain activity signal may be changed during the subject's electrical stimulation and haptic stimulation, which will be described later, and the subject's brain activity signal that changes may be measured in real time by the measurement unit 300. In other words, the subject's condition may be determined based on the subject's brain activity signal information that changes due to electrical stimulation and haptic stimulation. In particular, the brain activity region of interest requiring rehabilitation treatment is identified and the optimal rehabilitation treatment may be performed accordingly.

The electrical stimulation unit 400 may apply electrical stimulation to the subject's brain and adjust the subject's brain activity according to the applied electrical stimulation.

The electrical stimulation unit 400 may be a multi-channel system having a plurality of unit stimulation portions 150. The electrical stimulation unit 400 may use a transcranial direct current stimulation (tDCS) method. The tDCS non-invasively applies fine current stimulation to a transcranial region to stimulate the brain, thereby regulating the electrical activity of the brain, enabling control of brain cognitive function. In addition, the tDCS has the ability to enhance or suppress the activity of brain nerve cells, so it is known to be effective in the treatment of many cranial nerve diseases such as depression, epilepsy, dementia, Parkinson's disease, tic disorder, tinnitus, addiction, chronic pain, anxiety disorder, and sleep disorder, as well as rehabilitation treatment of brain diseases such as stroke.

As a supplementary explanation, the tDCS may apply electrical stimulation to the subject's brain through an anode and a cathode. In order to apply electrical stimulation to a region of interest that is part of the subject's brain among a plurality of unit stimulation portions, a unit stimulation portion located at a position corresponding to the region of interest, among the plurality of unit stimulation portions, is set as an anode or a cathode, and stimulation is applied by flowing a current from the anode to the cathode.

When electrical stimulation is applied to the subject's brain through the electrical stimulation unit 400, the brain activity signal measured through the measurement unit 300 may change, the subject's brain activity signal is monitored in real time based on the changing brain activity signal, and it is possible to detect the brain activity region of interest that requires rehabilitation treatment.

The electrical stimulation unit 400 may adjust and set the conditions of the electrical stimulation delivered to the subject's brain, that is, the intensity and on/off location of the electrical stimulation, by an electrical stimulation setting portion 710.

The haptic stimulation unit 500 may induce the subject's haptic stimulation motion based on the content provided to the subject from a content providing unit 550 and adjust the subject's brain activity according to the subject's haptic stimulation motion.

Referring to FIG. 2, the content providing unit 550 may deliver the content stored in the content storage portion to the subject using images, sounds, etc. The content storage portion may store content with various difficulty levels that are relevant to real life. Then, the subject may implement haptic motion using the haptic stimulation unit 500 according to the content provided by the content providing unit 550.

The content providing unit 550 may adjust and set the difficulty level of the content provided to the subject by a content setting portion 720.

The haptic stimulation unit 500 may include a haptic stimulation device, and the haptic stimulation device may enable the subject to implement haptic stimulation motion corresponding to the content provided to the content providing unit 550. The haptic stimulation device may be provided in various types, such as rotation type or pressure type, to suit various contents. Additionally, the haptic stimulation device may adjust the resistance of the subject operating the haptic stimulation device in accordance with the difficulty of the content provided to the subject by the content providing unit 550.

When a haptic stimulation motion is implemented in a subject through the haptic stimulation unit 500, the brain activity signal measured through the measurement unit 300 may change, and the subject's condition may be determined based on the changed brain activity signal, and the brain activity region of interest requiring rehabilitation treatment may be detected.

Here, the brain activity signal that changes by applying electrical stimulation to the subject's brain through the electrical stimulation unit 400 and the brain activity signal that changes by the subject implementing haptic motion through the haptic stimulation unit 500 may be the same signal or different signals. In other words, by simultaneously applying electrical stimulation and haptic stimulation to the subject, more accurate and wider brain activity signals may be measured, which may increase the reliability of the subject's rehabilitation treatment.

The haptic stimulation unit 500 may adjust and set the subject's haptic stimulation condition, that is, resistance in the haptic stimulation motion by a haptic stimulation setting portion 730.

The detection unit 600 may compare the brain activity signal measured by the measurement unit 300 with a preset reference brain activity signal and detect a brain activity region of interest 610 in the subject's brain that requires rehabilitation treatment.

The brain activity region of interest 610 refers to a partial region of the entire brain region of the subject, and may be a partial area where a brain activity signal is acquired through the measurement unit 300 to which a multi-channel method is applied. This may be a partial region where electrical stimulation is applied through the electrical stimulation unit 400 to which a multi-channel method is applied. There may be one or several brain activity regions of interest 610.

The brain activity region of interest 610 may be set according to the location and distribution of the brain activity signal measured by the measurement unit 300, as well as the intensity of the brain activity signal. For example, the region and depth of the region of interest may be set according to the intensity, measurement area and depth, etc. of the brain activity signal.

A reference brain activity signal may correspond to a brain activity signal obtained from the brain of a subject in a normal state that does not require rehabilitation treatment. Therefore, whether or not the brain activity region of interest 610 requiring rehabilitation treatment is created may be determined depending on a difference between the measured brain activity signal and the reference brain activity signal.

For example, if a difference value between the measured brain activity signal and the reference brain activity signal does not exceed a tolerance value, the brain activity region of interest 610 does not exist and rehabilitation treatment through the electrical stimulation unit 400 or the haptic stimulation unit 500 may not be required. Additionally, if the difference value between the measured brain activity signal and the reference brain activity signal is outside the tolerance value, the brain activity region of interest 610 is created, and personalized rehabilitation treatment for the brain active region of interest 610 may be performed through the electrical stimulation unit 400 or the haptic stimulation unit 500.

The control unit 700 may have the electrical stimulation setting portion 710.

The electrical stimulation setting portion 710 may control the electrical stimulation unit 400 based on the brain activity region of interest 610 detected by the detection unit 600, and adjusts and set the electrical stimulation conditions of the electrical stimulation unit 400.

The electrical stimulation setting portion 710 may basically set the intensity of electrical stimulation to be applied to the brain active region of interest through the electrical stimulation unit 400.

However, there is a limit to precise electrical stimulation of the brain active region of interest 610 by only adjusting the intensity of the electrical stimulation to be applied to the brain active region of interest. That is, when applying the electrical stimulation for rehabilitation treatment to the brain activity area of interest 610, accurate electrical stimulation may be needed to be applied, and more precise and fine adjustment is required, in consideration of various variables such as the location, distribution, and flow direction of the signal of the brain activity signal measured by the measurement unit 300, as well as the intensity of the brain activity signal.

Referring to FIG. 4, when a multi-channel method in which the electrical stimulation unit 400 has the plurality of unit stimulation portions 150 is applied, the electrical stimulation setting portion 710 may select a first unit stimulation portion of the plurality of unit stimulation portions 150 disposed at a location corresponding to the brain activity region of interest 610 as an anode. In addition, one or more second unit stimulation portions present in the brain activity region of interest 610 among the remaining unit stimulation portions excluding the first unit stimulation portion may be selected as a cathode. Herein, one set of electrical stimulation units consisting of one first unit stimulation portion and one or more second unit stimulation portions may be provided in a plurality of sets within one brain activity region of interest 610. In FIG. 5, for the plurality of unit stimulation portions 150 present in one brain active region of interest

610, two first unit stimulation portions are set as an anode, and five second unit stimulation portions are set as a cathode.

Here, according to the brain activity signal measured in real time in the brain activity region of interest 610 through the measurement unit 300, the first unit stimulation portion (anode) and the second unit stimulation portion (cathode) may be reset in real time. Additionally, the quantity of the second unit stimulation portion and a separation distance of the second unit stimulation portion from the first unit stimulation portion may also be reset in real time.

In this way, it is possible to apply more precise and fine electrical stimulation to the brain active region of interest 610 by resetting the quantity and separation distance of the first unit stimulation portion and second unit stimulation portion, as well as the intensity of the electrical stimulation signal to be applied from the first unit stimulation portion (anode) and second unit stimulation portion (cathode), according to the brain activity signal measured in real time in the brain activity region of interest 610 through the measurement unit 300.

The control unit 700 may further include the content setting portion 720.

The content setting portion 720 may control the content providing unit 550 based on the brain activity region of interest 610 detected by the detection unit 600, and adjust and set a difficulty level of the content provided to the subject from the content providing unit 550.

The control unit 700 may further include the haptic stimulation setting portion 730.

The haptic stimulation setting portion 730 may control the haptic stimulation unit 500 based on the brain activity region of interest 610 detected by the detection unit 600, and adjust and set the haptic stimulation conditions of the haptic stimulation unit 500.

Basically, the haptic stimulation setting portion 730 may set the haptic stimulation conditions of the haptic stimulation unit 500 according to a difficulty level of the content provided to the subject by the content providing unit 550.

In this way, during rehabilitation treatment of the subject using the electrical stimulation unit 400, the content providing unit 550, and the haptic stimulation unit 500, the electrical stimulation setting portion 710, more effective rehabilitation treatment for the subject is possible by adjusting the electrical stimulation conditions, a difficulty level of content, and haptic stimulation conditions in real time through the electrical stimulation setting portion 710, content setting portion 720, and haptic stimulation setting portion 730.

Referring to FIG. 5, the multimodal cranial nerve stimulation treatment system for personalized optimal rehabilitation according to the embodiment may further include a multi-channel probe assembly.

The probe assembly may include a probe 100 that integrates the unit stimulation portion 140 for applying electrical stimulation to the subject's brain and the unit measurement portion 150 for measuring the subject's brain activity, and a holder 200 for fixing and supporting the probe 100 from a cap 10 worn on the subject's head.

Here, the unit measurement portion 140 and unit stimulation portion 150, which constitute the multi-channel measurement unit 300 and the electrical stimulation unit 400, may be integrated into one probe 100. Through this, it is possible to measure brain activity signals transmitted from the brain activity region of interest 610 and simultaneously apply electrical stimulation to the brain activity region of interest.

In addition, by configuring the integrated probe 100 so that the unit measurement portion 140 and the unit stimulation portion 150 correspond one-to-one, electrical stimulation is applied to a certain region of the subject's brain and at the same time, the brain activity signal in the corresponding region may be accurately measured.

The probe assembly in which the unit measurement portion 140 and the unit stimulation portion 150 are integrated will be described later.

Hereinafter, a multimodal cranial nerve stimulation treatment method for personalized optimal rehabilitation according to the embodiment will be described.

The multimodal cranial nerve stimulation treatment method for personalized optimal rehabilitation according to the embodiment may be implemented by the multimodal cranial nerve stimulation treatment system for personalized optimal rehabilitation described above, and may include a measurement step, stimulation step, detection step, and stimulation adjustment step.

The measurement step may be a step of measuring brain activity signals transmitted from the subject's brain using the measurement unit.

The stimulation step may be a step of applying electrical stimulation to the subject's brain using the electrical stimulation unit, or adjusting the subject's brain activity by using the haptic stimulation unit to induce the subject's haptic stimulation motion based on the content provided to the subject from the content providing unit.

The detection step may be a step of detecting a brain activity region of interest requiring rehabilitation treatment by comparing the measured brain activity signal with a preset reference brain activity signal.

The stimulation adjustment step may be a rehabilitation treatment step, and may be a step of controlling at least one of the electrical stimulation unit, content providing unit, and haptic stimulation unit to change the subject's brain activity level, based on the brain activity signal information in the detected brain activity region of interest.

This method will be described step by step for clarity, but does not specify the order of each step. Some of these steps may be skipped, performed in parallel, or performed without strictly maintaining sequential order.

As described above, according to the disclosure, since the subject's brain activity signal is precisely measured through the measurement unit 300, the measured brain activity signal is analyzed and processed to visualize and monitor the brain activity state, and the cranial nerves is stimulated with the correct region and intensity based on the brain activity status monitored in real time, the subject's brain disease can be effectively treated.

In addition, according to the disclosure, based on the measured brain activity signal, electrical stimulation is primarily applied to the subject's brain through the electrical stimulation unit 400, or electrical stimulation is secondarily applied to the subject's brain through the haptic stimulation unit 500. Accordingly, personalized optimal rehabilitation treatment for each subject is possible.

In addition, according to the disclosure, the anode and cathode of the unit stimulation portion 150 of the electrical stimulation unit 400 are turned on and off based on the measured brain activity signal while adjusting and setting the quantity and separation distance of the second unit stimulation portion, which is set as a cathode, based on the first unit stimulation portion, which is set as an anode. Accordingly, more precise and accurate electrical stimulation can be applied according to the brain activity signal measured in the subject's brain activity region of interest 610.

Hereinafter, a probe assembly according to the embodiment will be described in detail.

Figure 6:
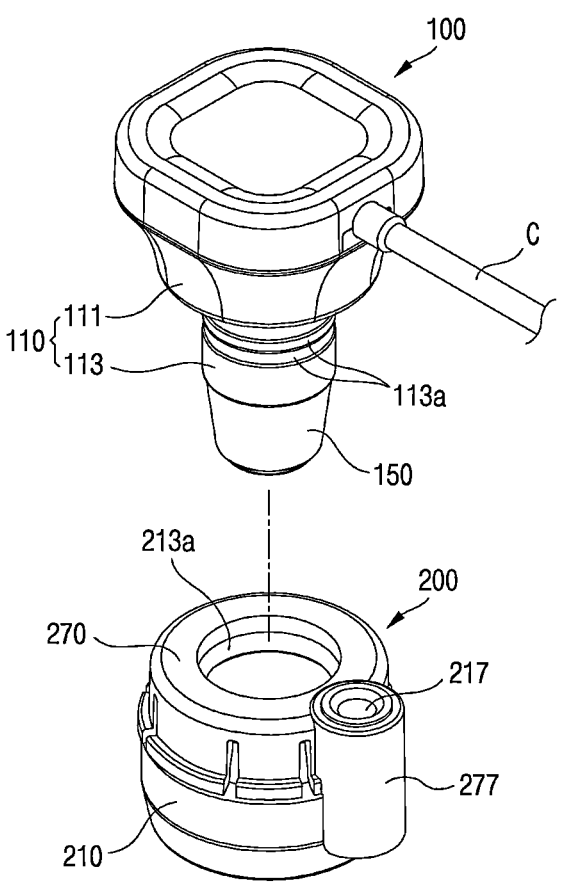
FIG. 6 is an exemplary disassembled diagram of a probe assembly according to an embodiment of the disclosure.
Figure 7:
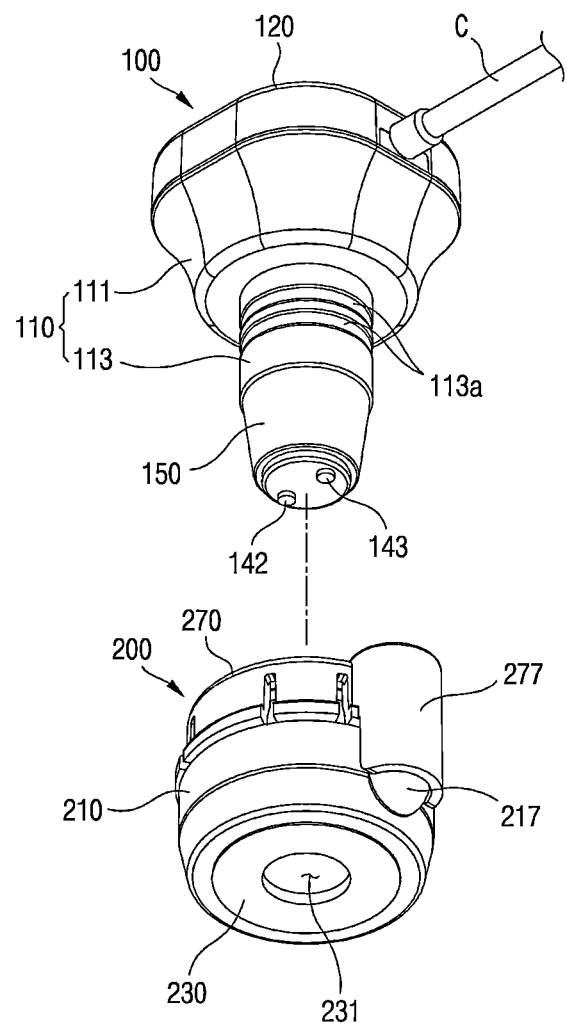
FIG. 7 is an exemplary disassembled diagram of a probe assembly viewed from another direction according to an embodiment of the disclosure.
Figure 8:
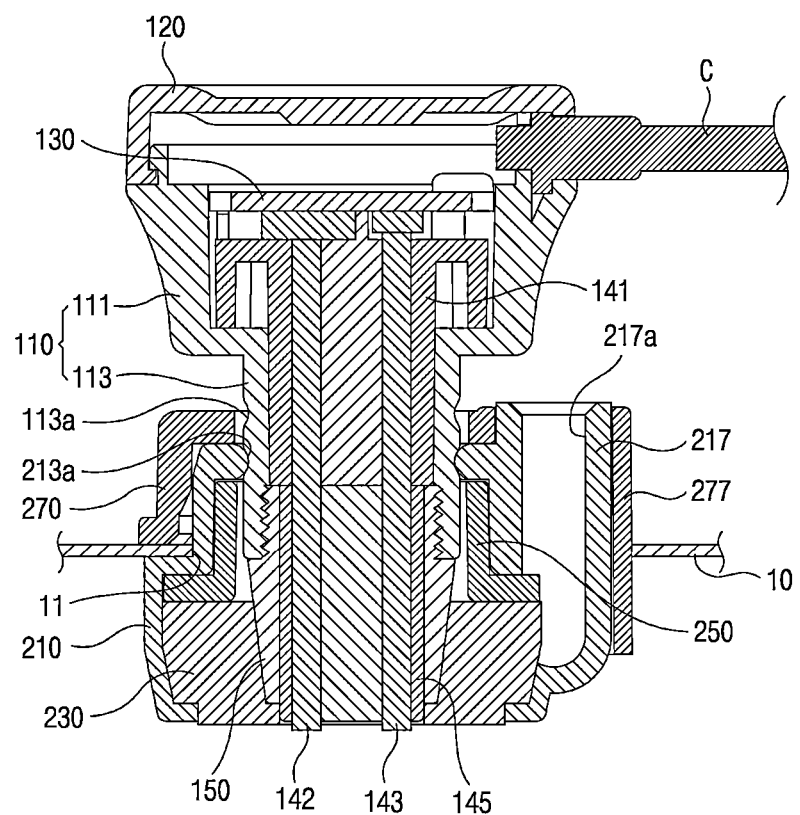
FIG. 8 is an exemplary cross-sectional diagram of a combined probe assembly according to an embodiment of the disclosure.

FIG. 6 is an exemplary disassembled diagram of a probe assembly according to an embodiment of the disclosure, FIG. 7 is an exemplary disassembled diagram of a probe assembly viewed from another direction according to an embodiment of the disclosure, FIG. 8 is an exemplary cross-sectional diagram of a combined probe assembly according to an embodiment of the disclosure.

Figure 9:
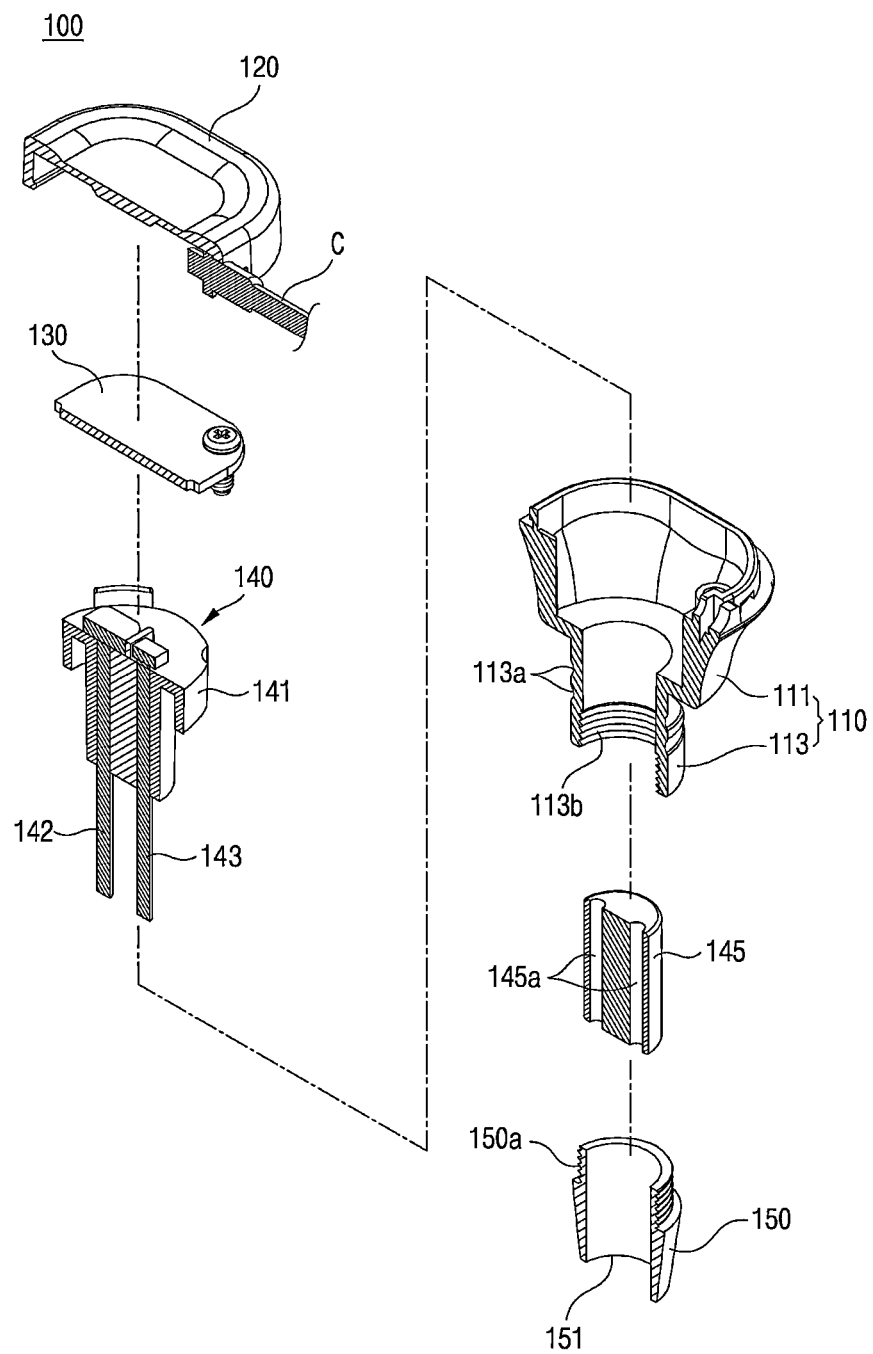
FIG. 9 is an exemplary disassembled diagram of a probe according to an embodiment of the disclosure.
Figure 10:
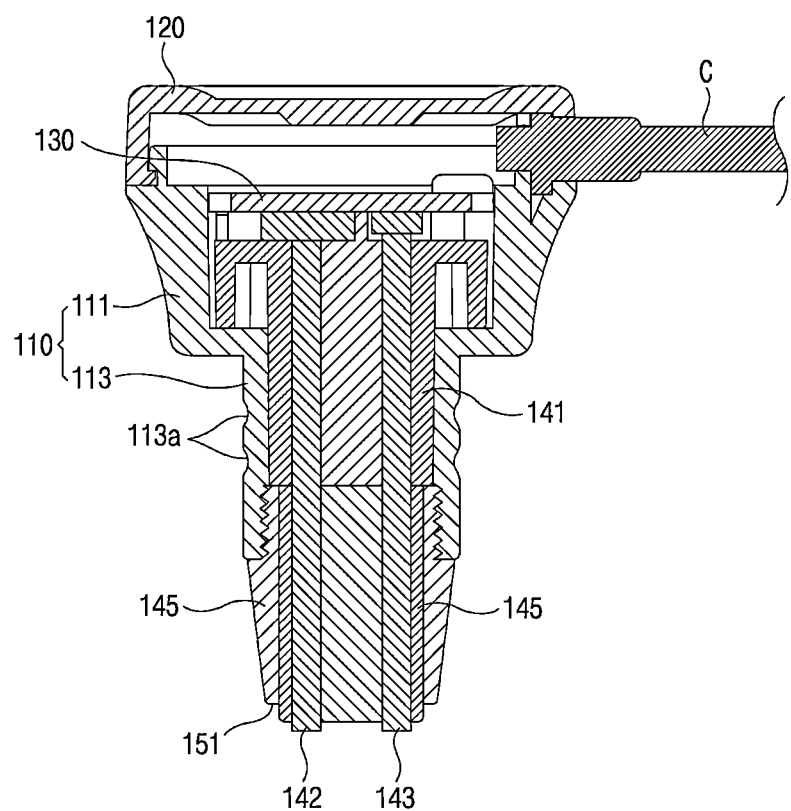
FIG. 10 is an exemplary cross-sectional diagram of a probe according to an embodiment of the disclosure.

In addition, FIG. 9 is an exemplary disassembled diagram of a probe according to an embodiment of the disclosure, FIG. 10 is an exemplary cross-sectional diagram of a probe according to an embodiment of the disclosure.

Figure 11:
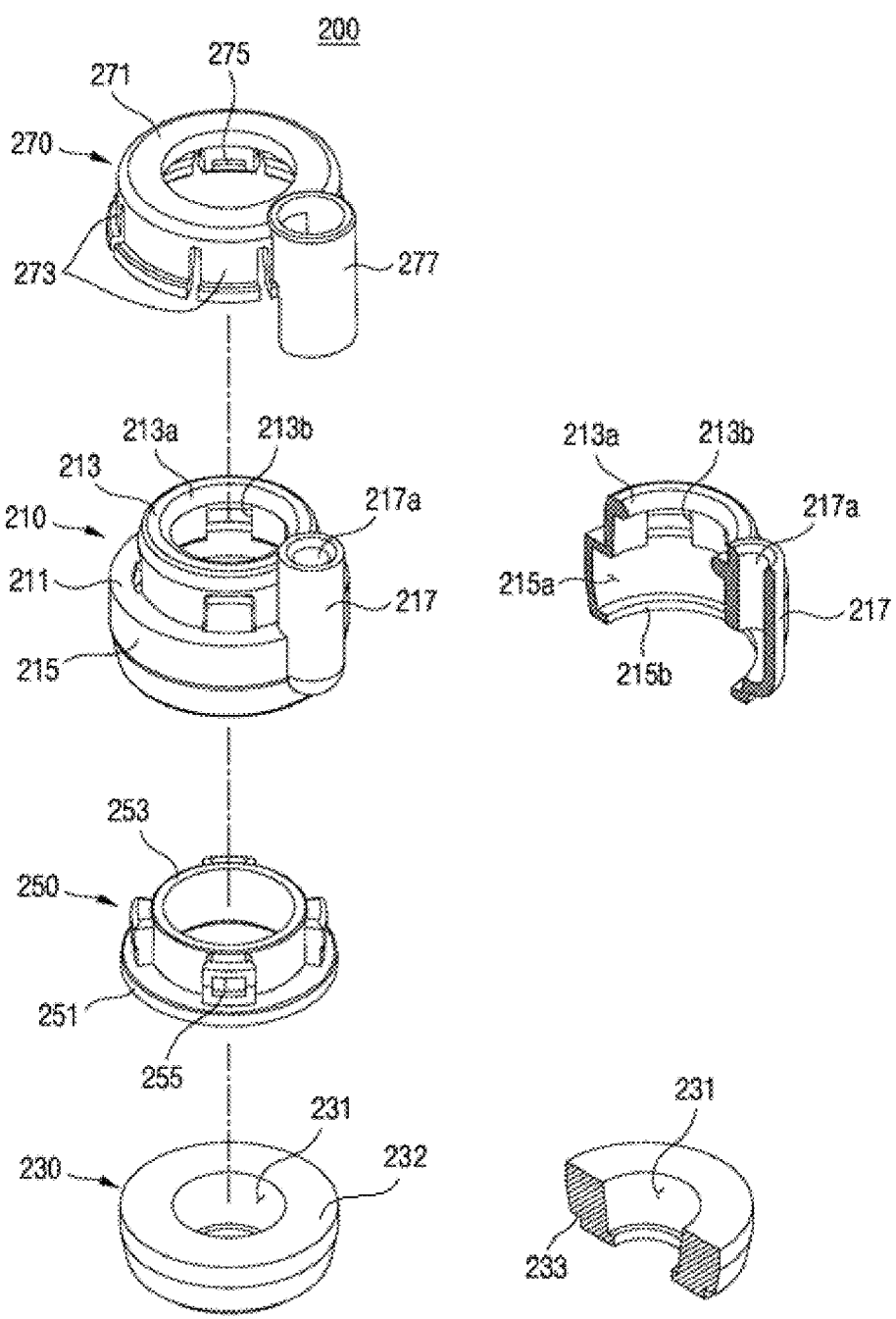
FIG. 11 is an exemplary disassembled diagram of a holder according to an embodiment of the disclosure.
Figure 12:
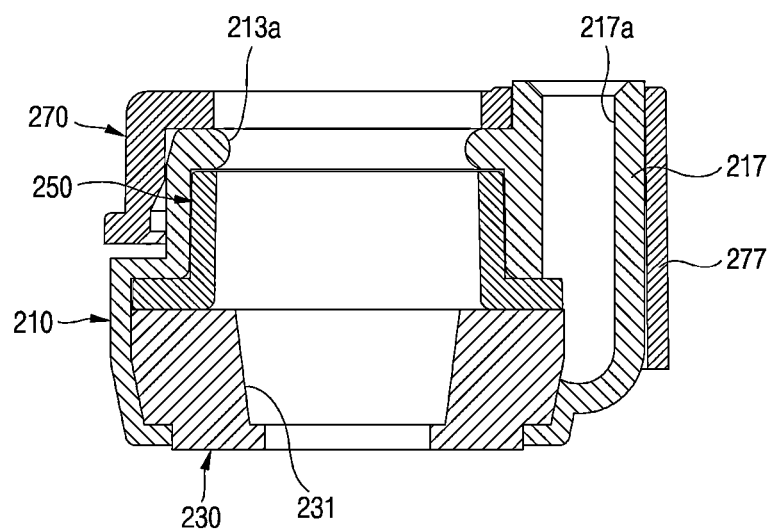
FIG. 12 is an exemplary cross-sectional diagram of a holder according to an embodiment of the disclosure.

In addition, FIG. 11 is an exemplary disassembled diagram of a holder according to an embodiment of the disclosure, FIG. 12 is an exemplary cross-sectional diagram of a holder according to an embodiment of the disclosure.

The probe assembly according to the embodiment includes the probe 100 and the holder 200.

The probe 100 is to apply electrical stimulation to the subject's brain and simultaneously measure the subject's brain activity, and may include a case 110, the unit measurement portion 140, and the unit stimulation portion 150.

The case 110 may include a head portion 111 and a pipe portion 113.

The head portion 111 is a portion exposed to the outside when the case 110 is coupled to the holder 200, and a circuit board 130 may be placed inside the head portion 111.

The circuit board 130 is electrically connected to an externally supplied control line (C), and a series of electronic circuits for controlling the operations of the unit measurement portion 140 and unit stimulation portion 150 are mounted on the circuit board 130. The circuit board 130 may be coupled to be movable in the vertical direction within the head portion 111. Herein, the unit measurement portion 140, which will be described later, may be mechanically coupled to and supported on the circuit board 130, and then the unit measurement portion 140 may be moved in the vertical direction together with the circuit board 130.

Meanwhile, the case 110 may further include a head cover 120. The head cover 120 may be coupled to the open upper surface of the head portion 111. In this case, although not shown, an elastic member may be installed between the head cover 120 and the upper surface of the circuit board 130, which is opposite the unit measurement portion 140. That is, the circuit board 130 and the unit measurement portion 140 may be elastically supported in a downward direction toward the subject's scalp by the restoring force of the elastic member.

A pipe portion 113 is a portion where the case 110 is coupled to the holder 200, extends from the head portion 111, and forms a hollow structure with an open lower portion. The pipe portion 113 may have a plurality of ring-shaped coupling grooves 113a spaced apart along the height direction (longitudinal direction) on the outer peripheral surface. A coupling groove 113a may be coupled to a protrusion 213a of a body 210, which will be described later. Additionally, the pipe portion 113 may have a first threaded portion 113b formed on the lower inner surface. The first threaded portion 113b may be screwed to a second threaded portion 150a of an electrode, which will be described later.

The head portion 111 and the pipe portion 113 may be formed as a single molded product.

The unit measurement portion 140 emits light toward the subject's brain and receives light reflected from the subject's brain, and measures the subject's brain activity based on a difference between the emitted light and the reflected light. The unit measurement portion 140 may include a light emitting portion 142 and a light receiving portion 143.

The light emitting portion 142 emits light toward the subject's brain and is disposed through the pipe portion 113, while an upper end may be electrically and mechanically connected to the circuit board 130, and the other end may be disposed to penetrate the pipe portion 113.

The light receiving portion 143 receives the light reflected from the subject's brain and is disposed through the pipe portion 113, while an upper end may be electrically and mechanically connected to the circuit board 130, and the other end may be disposed to penetrate the pipe portion 113.

That is, the light emitting portion 142 and the light receiving portion 143 are arranged side by side in the central core portion of the pipe portion 113 while being spaced apart at a set interval. Herein, lower output ends of the light emitting portion 142 and light receiving portion 143 are arranged to protrude from the pipe portion 113 toward the subject's scalp.

This unit measurement portion 140 may use functional near-infrared spectroscopy (fNIRS).

The unit measurement portion 140 may further include a first support block 141 and a second support block 145.

The first support block 141 is inserted into the head portion 111 and the pipe portion 113, and may have a first through hole that penetrates the light emitting portion 142 and light receiving portion 143. That is, the first support block 141 may fixedly support the upper ends of the light emitting portion 142 and light receiving portion 143 coupled to the circuit board 130.

The second support block 145 extends downward from the lower surface of the first support block 141 through the pipe portion 113, and may include a second through hole 145a that penetrates the light emitting portion 142 and light receiving portion 143. That is, the second support block 145 may fixedly support the lower ends of the light emitting portion 142 and light receiving portion 143 penetrating the pipe portion 113. Herein, the lower ends, which are the output ends of the light emitting portion 142 and light receiving portion 143, are disposed to protrude downward from the second support block 145. In addition, the second support block 145 may be made of a material having blackout properties to increase the transmission effect of the light emitting portion 142 and the reception effect of the light receiving portion 143. In addition, the second support block 145 may function to space the electrode of the unit stimulation portion 150 disposed on the outer surface from the light emitting portion 142 and light receiving portion 143 from each other.

The unit stimulation portion 150 is used to apply electrical stimulation to the subject's brain and may include an electrode.

The electrode may be formed in a cylindrical shape coupled to the lower portion of the pipe portion 113 to surround the lower ends of the light emitting portion 142 and light receiving portion 143 penetrating the pipe portion 113. Specifically, the electrode may be provided with a second threaded portion 150a on the upper outer surface, and may be fixedly coupled by being inserted to surround the second support block 145 and screwed with the first threaded portion 113b of the pipe portion 113. Herein, it is preferable that the lower end 151, which is the output end of the electrode, is placed higher above the lower end of the first support block 141. Additionally, although not shown in detail, the electrode may be coupled to the pipe portion 113 and electrically connected to the circuit board 130 at the same time.

The holder 200 fixedly supports the probe 100 and may be coupled to the cap 10 worn on the subject's head. That is, the holder 200 may be coupled to a plurality of mounting holes 11 formed in the cap 10.

In general, the location of the probe assembly coupled to the mounting hole 11 of the cap 10, that is, the location at which electrical stimulation is applied and the location at which brain activity signals are measured, follow a preset reference pattern model. Generally, a reference pattern model uses the internationally recognized International 10-20 System.

The holder 200 may include the body 210 and an electrical resistance reduction portion 230.

The body 210 is coupled through the mounting hole 11 of the cap 10, and forms a hollow structure with the upper and lower portions open so that the pipe portion 113 can be inserted through the mounting hole 11. This body 210 can fix and support the outer peripheral surface of the pipe portion 113 of the probe 100 that penetrates and is coupled thereto.

The body 210 may be made of a stretchable material such as silicon, and may be coupled to the mounting hole 11 of the cap 10 in an interference fit manner. The probe 100, which is fixedly supported by the body 210 made of an elastic material, may be elastically supported in close contact with the subject's scalp.

The body 210 may be provided with the protrusion 213a coupled to the coupling groove 113a of the pipe portion 113 on the inner peripheral surface.

That is, when the probe 100 is coupled to the holder 200, the installation height of the probe 100 may be changed depending on the position of the coupling groove 113a of the pipe portion 113 coupled to the protrusion 213a of the body 210. Then, the installation height of the probe 100 may be appropriately adjusted according to the condition of the subject's head.

The electrical resistance reduction portion 230 may be inserted and coupled to an open lower space 215 a of the body 210 to connect the unit stimulation portion 150 and the subject's scalp, and may include a porous block 232 and an electrically conductive solution.

The porous block has a shape corresponding to the shape of the lower space 215a of the body 210, and has a through hole 231 at the center to allow light transmitted and received from the unit measurement portion 140 to the subject's scalp to pass through.

Specifically, the porous block may be made of a material with micropores, such as a sponge. In addition, the porous block may be coupled to the lower space 215a of the body 210 by interference fitting. When the insertion of the porous block into the lower space 215a is completed, a seating groove 233 formed on the lower edge of the porous block is supported by a locking protrusion 215b formed on the open lower edge of the lower space 215a, thereby preventing separation. In addition, the inner peripheral surface of the porous block inserted into the lower space 215a surrounds the electrode of the unit measurement portion 140 and is placed in close contact with the electrode. Herein, the lower surface of the porous block protrudes downward from the lower surface of the body 210 and maintains a low position so as to be in close contact with the subject's scalp. Accordingly, the microcurrent applied from the electrode may pass through the porous block and be transmitted to the subject's scalp.

The electrically conductive solution may be filled inside the micropores of the porous block, and saline solution or the like may be used as the electrically conductive solution.

In this way, by placing the electrical resistance reduction portion 230 between the electrode of the unit stimulation portion 150 and the subject's scalp, it is possible to reduce the electrical resistance between the electrode and the scalp even if hair or the like impedes an electric flow.

Meanwhile, the electrically conductive solution contained in the porous block may be exhausted over time, thereby reducing the electrical conductivity of the electrical resistance reduction portion 230.

To this end, the body 210 may include a supplementary solution injection portion 217 for replenishing the electrically conductive solution.

The supplementary solution injection portion 217 may be formed integrally with the outer surface of the body 210, and include an injection hole 217a communicating with the lower space 215a of the body 210 where the porous block of the electrical resistance reduction portion 230 is located. That is, regardless of whether the probe assembly is used, the electrically conductive solution may be injected and replenished through the injection hole 217a to continuously maintain an appropriate amount of the electrically conductive solution in the porous block.

Meanwhile, the body 210 according to the embodiment may be coupled to the mounting hole 11 from the inside of the cap 10 toward the outside. Herein, the body 210 may be divided into a lower body 215 disposed inside the cap 10 and an upper body 213 disposed outside the cap 10, based on a step 211 that is in close contact with the lower surface of the edge of the mounting hole 11.

In this case, the holder 200 may further include a fixing cap for fixing the body 210 to the mounting hole 11 of the cap 10.

The fixing cap may further include a lower fixing cap 250 and an upper fixing cap 270.

The lower fixing cap 250 may be previously inserted into the open lower space 215a of the lower body 215 from the inside of the cap 10 before combining the electrical resistance reducing portion 230. The lower fixing cap 250 may include a lower flange 251, a sleeve 253, and a locking portion 255.

The lower flange 251 may press the lower body 215 upward toward the lower surface of the edge of the mounting hole 11 of the cap 10.

The sleeve 253 extends upward from the lower flange 251 and may be in close contact with the inner surface of the upper body 213.

A plurality of locking portions 255 may be arranged spaced apart along the circumferential direction on the outer surface of the sleeve 253 and may protrude through a side opening 213b of the upper body 213. The locking portion 255 may be coupled to a hook 275 of the upper fixing cap 270.

The upper fixing cap 270 may be coupled to surround the upper body 213 on the outside of the cap 10. Further, the upper fixing cap 270 may be combined with the lower fixing cap 250 to bring the step 211 of the body 210 into close contact with the lower surface of the edge of the mounting hole 11. The upper fixing cap 270 may include an upper flange 271, an elastic sleeve 273, and the hook 275.

The upper flange 271 may press the upper body 213 downward.

The elastic sleeve 273 extends downward from the upper flange 271 to surround the upper body 213, and a plurality of elastic sleeves 273 may be arranged to be spaced apart along the circumferential direction of the upper flange 271.

The hook 275 is formed on the inner surface of the lower end of each elastic sleeve 273 and may be coupled to the locking portion 255 of the lower fixing cap 250 that penetrates the side opening 213b of the upper body 213.

That is, as the locking portion 255 of the lower fixing cap 250 and the hook 275 of the upper fixing cap 270 are coupled with the body 210 in between, the body 210 may be firmly coupled to the mounting hole 11 of the cap 10.

Meanwhile, the upper fixing cap 270 may further include an injection portion cover 277.

At the same time that the upper fixing cap 270 is coupled to the lower fixing cap 250, the injection portion cover 277 surrounds the supplementary solution injection portion 217 of the body 210, thereby protecting the supplementary solution injection portion 217 from the outside.

The probe assembly according to the embodiment can accurately perform current stimulation and brain activity measurement on a preset region of the subject's scalp through the light emitting portion 142 and light receiving portion 143 arranged side by side in the central core portion of the pipe portion 113 of the case 110, and the cylindrical unit stimulation portion (electrode) 150 coupled to the lower end of the pipe portion 113 of the case 110 to surround the light emitting portion 142 and light receiving portion 143.

In addition, the probe assembly according to the embodiment surrounds the unit measurement portion 140 and unit stimulation portion 150 and reduces the electrical resistance between the electrode and the scalp through the electrical resistance reduction portion 230 that connects the electrode of the unit stimulation portion 150 and the subject's scalp, even if hair or the like impedes the electric flow, thereby ensuring that uniform current stimulation is delivered to the subject's scalp.

In addition, the probe assembly according to the embodiment is integrated with the supplementary solution injection portion 217 that replenishes the electrically conductive solution toward the electrical resistance reduction portion 230, and can replenish the electrically conductive solution to the electrical resistance reduction portion 230 in use, without separating the probe 100 and holder 200 in case where the electrically conductive solution is exhausted over time. Accordingly, the subject's brain nerve control rehabilitation training can be more effectively performed and, above all, the intensity of the current stimulation delivered to the subject's scalp can be uniformly maintained.

In addition, in the probe assembly according to the embodiment, when the probe 100 is coupled to the holder 200, the plurality of coupling grooves 113a formed in the pipe portion 113 of the probe 100 can be supported while selectively coupled to the protrusion 213a of the body 210 of the holder 200. Therefore, the setting positions of the unit measurement portion 140 and unit stimulation portion 150 with respect to the subject's scalp can be easily adjusted.

In addition, when the holder 200 is coupled to the mounting hole 11 of the cap 10, the probe assembly according to the embodiment provides a non-bolt type coupling structure of the locking portion 255 of the lower fixing cap 250 and the hook 275 of the upper fixing cap 270 with the body 210 in between. Therefore, not only does it become easier to attach and separate the holder 200 from the mounting hole 11 of the cap 10, but the mounting positions of the holder 200 and probe 100 can be strengthened.

According to the disclosure, precise measurement and real-time monitoring of the subject's brain signals can be performed through the measurement unit, and various stimulations such s electrical stimulation and haptic stimulation can be induced to subjects in need of rehabilitation treatment based on the measured brain signals, so that optimal rehabilitation treatment can be performed for each subject.

The effects of the present disclosure are not limited to the above-mentioned effects, and it should be understood that the effects of the disclosure include all effects that could be inferred from the configuration of the invention described in the detailed description of the invention or the appended claims.

As described above, preferred embodiments of the disclosure have been described with reference to the drawings, but those skilled in the art will variously modify or change the disclosure within the scope not departing from the spirit and scope of the disclosure described in the following claims.

What is claimed is:

1. A probe assembly for brain nerve control, comprising:
   a probe for simultaneously applying an electrical stimulation to a brain of a subject and measuring a brain activity; and,
   a holder that is coupled to a mounting hole formed in a cap worn on a head of the subject to securely support the probe,
   wherein the probe includes:
     a case that includes a head portion and a pipe portion extending from the head portion;
     a measurement portion that is installed inside the pipe portion to measure the brain activity of the subject; and
     a stimulation portion that is installed at a lower portion of the pipe portion to surround the measurement portion, and to apply the electrical stimulation to the brain of the subject,
   wherein, the pipe portion is provided with a plurality of coupling grooves spaced apart along a height direction on an outer peripheral surface thereof,
   wherein the holder includes:
     a body that is coupled to the mounting hole and fixedly supports an outer circumferential surface of the pipe portion to be inserted; and
     an electrical resistance reduction portion that includes a porous block and an electrically conductive solution filled in the porous block,
   wherein, the porous block has a shape corresponding to a lower space of the body and is coupled to an open lower space of the body to connect the stimulation portion and a scalp of the subject, and includes a through hole formed to allow light transmitted and received from the measurement portion to pass through,
   wherein, the body includes a supplementary solution injection portion that replenishes the electrically conductive solution in the electrical resistance reduction portion, and a protrusion coupled to one of the plurality of coupling grooves on an inner peripheral surface thereof,
   wherein, the supplementary solution injection portion is formed integrally with the outer surface of the body, and includes an injection hole communicating with the lower space of the body to continuously maintain a predetermined amount of the electrically conductive solution in the porous block,
   wherein the measurement portion includes;
     a light emitting portion that emits light toward the brain of the subject,
     a light receiving portion that receives the light reflected from the brain of the subject, a first support block that is inserted into the head portion and the pipe portion, and a second support block that extends downward from the lower surface of the first support block through the pipe portion, wherein the first support block has first through holes through which the light emitting portion and the light receiving portion pass respectively, and the second support block has second through holes through which the light emitting portion and the light receiving portion pass respectively.

2. The system of claim 1, wherein the body is divided into a lower body disposed on an inside of the cap and an upper body disposed on an outside of the cap, based on a step in close contact with a lower surface of an edge of the mounting hole when the body is coupled to the mounting hole from the inside of the cap, the holder further includes:
a lower fixing cap that is inserted from the inside of the cap into an open lower space of the lower body; and
an upper fixing cap that is coupled to the outside of the cap to surround the upper body, and is coupled with the lower fixing cap to bring the step into close contact with the lower surface of the edge of the mounting hole.

3. The system of claim 2, where the lower fixing cap includes:
a lower flange that presses the lower body upward toward the lower surface of the edge of the mounting hole;
a sleeve that extends upward from the lower flange and is in close contact with an inner surface of the upper body; and
a plurality of locking portions that is formed on an outer surface of the sleeve and penetrates a side opening of the upper body and is coupled to the upper fixing cap.

4. The system of claim 3, wherein the upper fixing cap includes:
an upper flange that presses the upper body downward;
a plurality of elastic sleeves that extends downward from the upper flange and is spaced apart along a circumferential direction; and
a hook that is formed on a lower inner surface of the elastic sleeve and is coupled to the locking portions.

5. The system of claim 2, wherein the upper fixing cap includes an injection portion cover that is coupled to the lower fixing cap and simultaneously surrounds the supplementary solution injection portion.

6. The system of claim 1, wherein one ends of the light emitting portion and light receiving portion are electrically connected to a circuit board disposed on the head portion, and the other ends of the light emitting portion and light receiving portion are disposed through the pipe portion, wherein the stimulation portion includes a cylindrical electrode coupled to a lower portion of the pipe portion to surround lower ends of the light emitting portion and light receiving portion penetrating the pipe portion.

\* \* \* \* \*